(12) United States Patent
Draper et al.

(10) Patent No.: US 10,190,258 B2
(45) Date of Patent: Jan. 29, 2019

(54) DOCTOR BLADE HOLDERS AND DOCTOR BLADE HOLDER SYSTEMS INCLUDING PLANAR ELEMENTS WITH THREE DIMENSIONAL FABRIC REINFORCEMENT MATERIALS

(71) Applicant: Kadant, Inc., Auburn, MA (US)

(72) Inventors: Michael Draper, Wigan (GB); Mohan Jayaraman, Westford, MA (US); Ka Lun Tu, Auburn, MA (US)

(73) Assignee: Kadant Inc., Westford, MA (US)

( * ) Notice: Subject to any disclaimer, the term of this patent is extended or adjusted under 35 U.S.C. 154(b) by 0 days.

(21) Appl. No.: 15/237,330

(22) Filed: Aug. 15, 2016

(65) Prior Publication Data

US 2017/0044719 A1 Feb. 16, 2017

Related U.S. Application Data

(60) Provisional application No. 62/204,738, filed on Aug. 13, 2015.

(51) Int. Cl.
| | |
|---|---|
| *D21G 3/00* | (2006.01) |
| *D21G 3/02* | (2006.01) |
| *D21G 3/04* | (2006.01) |
| *C08K 3/36* | (2006.01) |
| *C08K 7/00* | (2006.01) |
| *C08K 7/02* | (2006.01) |
| *C08K 7/06* | (2006.01) |
| *C08K 7/14* | (2006.01) |

(52) U.S. Cl.
CPC .............. *D21G 3/005* (2013.01); *C08K 3/36* (2013.01); *C08K 7/00* (2013.01); *C08K 7/02* (2013.01); *C08K 7/06* (2013.01); *C08K 7/14* (2013.01); *D21G 3/02* (2013.01); *D21G 3/04* (2013.01)

(58) Field of Classification Search
CPC ............ D21G 3/00; D21G 3/005; D21G 3/02; D21G 3/04; B65G 45/12; B65G 45/14; B65G 45/16
USPC ................ 162/280–282, 199, 272; 15/256.5, 15/256.51, 256.52, 256.53
See application file for complete search history.

(56) References Cited

U.S. PATENT DOCUMENTS

| | | | | | |
|---|---|---|---|---|---|
| 2,767,529 | A | * | 10/1956 | Scott ...................... | D21G 3/005 100/102 |
| 6,977,029 | B2 | | 12/2005 | Takeuchi et al. | |

(Continued)

FOREIGN PATENT DOCUMENTS

| | | | | |
|---|---|---|---|---|
| EP | 2154289 | A2 | 2/2010 | |
| EP | 2455165 | * | 5/2012 | ............. D21G 3/005 |
| JP | 5-338048 | * | 12/1993 | |

OTHER PUBLICATIONS

International Search Report and the Written Opinion issued by the International Searching Authority dated Nov. 21, 2016 in related International Application No. PCT/US2016/047059.

(Continued)

*Primary Examiner* — Eric Hug
(74) *Attorney, Agent, or Firm* — Gesmer Updegrove LLP

(57) ABSTRACT

A planar element is disclosed for use in a papermaking system. The planar element is suitable for use as a doctor blade or a top plate and includes a three-dimensional composite structure including elongated elements extending in at least three orthogonal directions, and a resin in which the three-dimensional composite structure is embedded.

33 Claims, 3 Drawing Sheets

(56) References Cited

U.S. PATENT DOCUMENTS

| | | | | |
|---|---|---|---|---|
| 2002/0174966 A1* | 11/2002 | Brauns | .................... | D21F 11/00 |
| | | | | 162/198 |
| 2002/0189777 A1* | 12/2002 | Rata | ......................... | D21J 3/10 |
| | | | | 162/218 |
| 2003/0181117 A1* | 9/2003 | Takeuchi | .............. | D21F 3/0218 |
| | | | | 442/203 |
| 2005/0279478 A1* | 12/2005 | Draper | ................... | B82Y 30/00 |
| | | | | 162/280 |
| 2007/0052134 A1* | 3/2007 | Draper | ................... | B29C 70/12 |
| | | | | 264/257 |
| 2009/0208706 A1* | 8/2009 | Lindmark | .............. | D21G 3/005 |
| | | | | 428/172 |
| 2009/0221205 A1* | 9/2009 | Matilainen | ............. | D21G 3/005 |
| | | | | 442/389 |
| 2014/0023846 A1 | 1/2014 | Draper et al. | | |
| 2014/0106113 A1* | 4/2014 | Miettinen | ................ | B32B 5/12 |
| | | | | 428/113 |

OTHER PUBLICATIONS

International Preliminary Report on Patentability issued in related International Patent Application No. PCT/US2016/047059 dated Feb. 22, 2018.

* cited by examiner

DOCTOR BLADE HOLDERS AND DOCTOR BLADE HOLDER SYSTEMS INCLUDING PLANAR ELEMENTS WITH THREE DIMENSIONAL FABRIC REINFORCEMENT MATERIALS

PRIORITY

The present application claims priority to U.S. Provisional Patent Application Ser. No. 62/204,738 filed Aug. 13, 2015, the disclosure of which is hereby incorporated by reference in its entirety.

BACKGROUND

The invention generally relates to planar elements such as doctor blades and top plates, for use in papermaking machines, and relates in particular to doctor blades and top plates that provide improved stiffness and performance.

Doctor blades and top plates for use in doctor blade holders, are generally employed for processing moving surfaces in manufacturing systems involving rolls, webs or sheets such as in papermaking systems.

The processing of the moving surfaces is generally done by a doctor blade that is held by a doctor blade holder, which may include a top plate. The doctor blade holder works with the doctor blade to apply the working edge of the doctor blade to the surface being processed. FIG. 1 for example, shows a prior art doctoring apparatus 10 that is adjacent to the surface of a roll 12. The roll rotates about an axis $A_1$, and the doctoring apparatus includes a doctorback 14 that is rotatable about an axis $A_2$, which is parallel to the axis $A_1$. A doctor blade holder 16 is shown supported on a beam 18, which forms part of the doctorback. The doctor blade holder 16 includes has top plate 20 and a bottom plate 22 that are joined by a mounting and adjustment assembly. A doctor blade 24 is received within a lower jaw opening 26 on the underside of the top plate 20.

With further reference to FIG. 2, the mounting and adjustment assembly includes a plurality of top plate brackets 28 and a plurality of bottom plate brackets 30 that are mutually joined together by a pivot rod 32. The mounting and adjustment assembly also includes a loading tube 34 and an unloading tube 36 that may each be alternately increased or decreased in size by adjusting an amount of fluid within each tube to effect a limited rotation of the top plate with respect to the axis $A_3$ that is the central axis of the pivot rod 32. This limited rotation permits the doctor blade 24 to engage the roll 12 to effect doctoring, or to disengage the roll 12. A piston/cylinder unit 38 acts via a crank arm 40 to rotate the doctorback 14 about axis $A_2$ in order to provide gross positioning of the doctor blade 24 near and away from the roll surface.

The doctor blade may be formed of metal (for high stiffness and low thickness), plastic (for better conformance to the surface at a cost of being thicker), or a reinforced plastic. U.S. Pat. No. 4,549,933, for example discloses the use of synthetic material (e.g., fiber, some of which are oriented) in forming layers that are laminated together to form a doctor blade. U.S. Pat. No. 4,549,933 in fact, states that high stiffness and strength in the machine direction permits required blade loading with low deflection and without unacceptable increases in blade thickness (which translate into power losses), while lower stiffness in the cross machine direction allows the blade to confirm to roll surface irregularities without large changes in the required blade loading.

U.S. Patent Application Publication No. 2009/0208706 discloses a method of making a doctor blade from a thick needled felt consisting of polyamide and co-polyester fibres with a polyurethane surface coating. U.S. Pat. No. 6,977,029 discloses a doctor blade for a shoe press application made from a woven fabric base layer with plural fibrous batt layers needled punched into it. The structure is also made from polyamide, aromatic polyamide and polyester fibres.

Certain prior art doctor blades and top plates are made by applying several individual layers of 2-Dimensional reinforcement fabric together with a polymeric resin. The 2-D reinforcement fabrics used typically comprise glass fibres, carbon fibres or combinations of both. Glass fabrics impart the doctor blades with cleaning and abrasive properties, whilst carbon reinforcement is used to improve the wear life of the doctor blade and strength and stiffness of a top plate. Different combinations of both are used depending on the property and performance requirement of a particular doctor blade or top plate. For example, 8 layers of 200 gsm plain weave 2-D glass fabric may be bonded together to produce a doctor blade of thickness 1.5 mm, as shown for example in FIG. 3.

Fabric reinforcement containing aramid fibres may also be included to impart the doctor blades and top plates with increased impact resistance. Micron sized fillers are also commonly used to further reinforce the resin and give the blades additional property enhancements. For example silicon carbide is commonly used to give doctor blades additional abrasive properties.

Heat and pressure have been used to cure the polymeric resin and chemically bond the individual 2-D reinforcement layers together. Under the extreme conditions often experienced on a paper machine however, including, contact with abrasive and aggressive paper fillers, e.g. calcium carbonate and titanium dioxide, impact with stickies and exposure to petrochemical based roll cleaning solvents, the chemical bonds can fail causing the individual layers to open up and delaminate, ultimately resulting in failure, as paper stock fibres penetrate into the body of the blade or Top Plate as shown, for example in FIG. 4.

There remains a need therefore, for a planar element such as a doctor blade, for use in a papermaking machine, wherein the doctor blade provides improved performance and durability.

SUMMARY

In accordance with an embodiment, the invention provides a planar element for use in a papermaking system. The planar element is suitable for use as a doctor blade or a top plate, and the planar element includes a three-dimensional composite structure including elongated elements extending in at least three orthogonal directions, and a resin in which the three-dimensional composite structure is embedded.

In accordance with another embodiment, the invention provides a doctor blade for use in a papermaking system. The doctor blade includes a three-dimensional fabric composite structure including elongated elements extending in at least three orthogonal directions, at least some of the elongated elements being woven together, and a resin in which the three-dimensional composite structure is embedded.

In accordance with a further embodiment, the invention provides a method of forming a doctor blade. The method includes the steps of forming a three dimensional fabric structure that includes elongated elements that extend at least in part, in each of three elongated directions, and embedding the three-dimensional fabric structure with a resin.

BRIEF DESCRIPTION OF THE DRAWINGS

The following description may be further understood with reference to the accompanying drawings in which.

Figure 1:
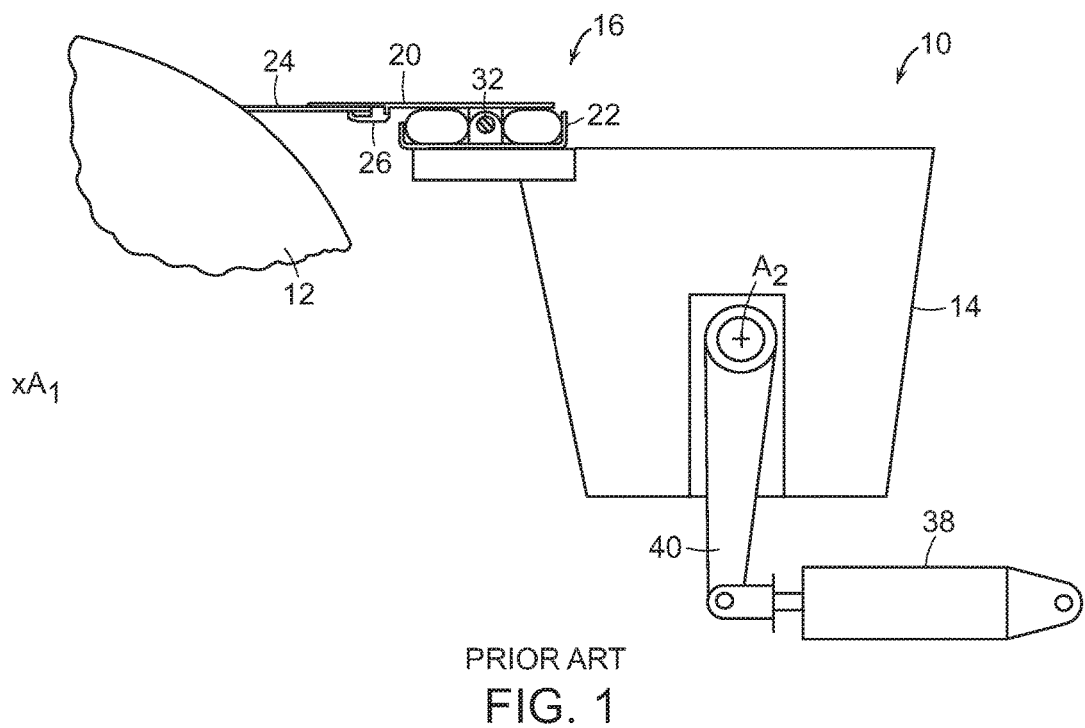
FIG. 1 shows an illustrative diagrammatic view of a papermaking system in which a planar element of the invention may be used.
Figure 2:
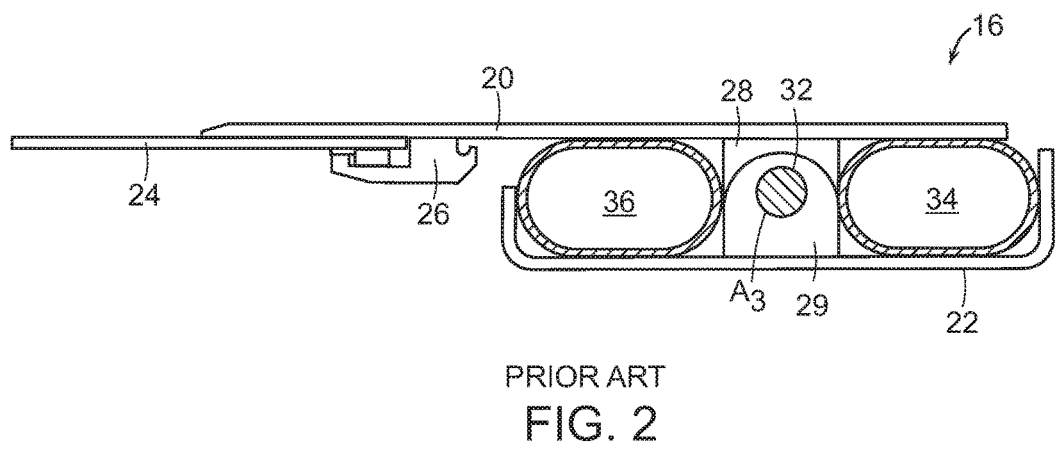
FIG. 2 shows an illustrative diagrammatic view of a doctor blade and doctor blade holder system in which a planar element of the invention may be used.
Figure 3:
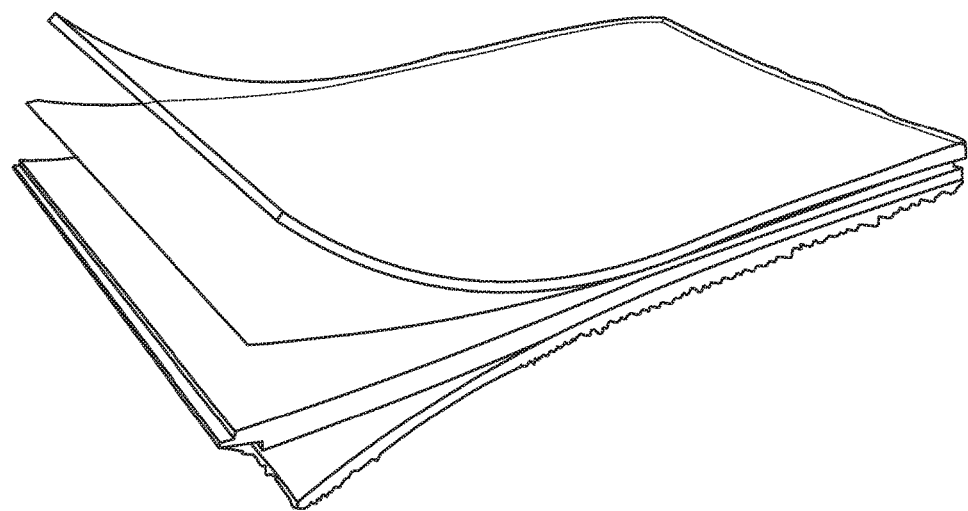
FIG. 3 shows an illustrative diagrammatic view of a doctor blade of the prior art delaminating.
Figure 4:
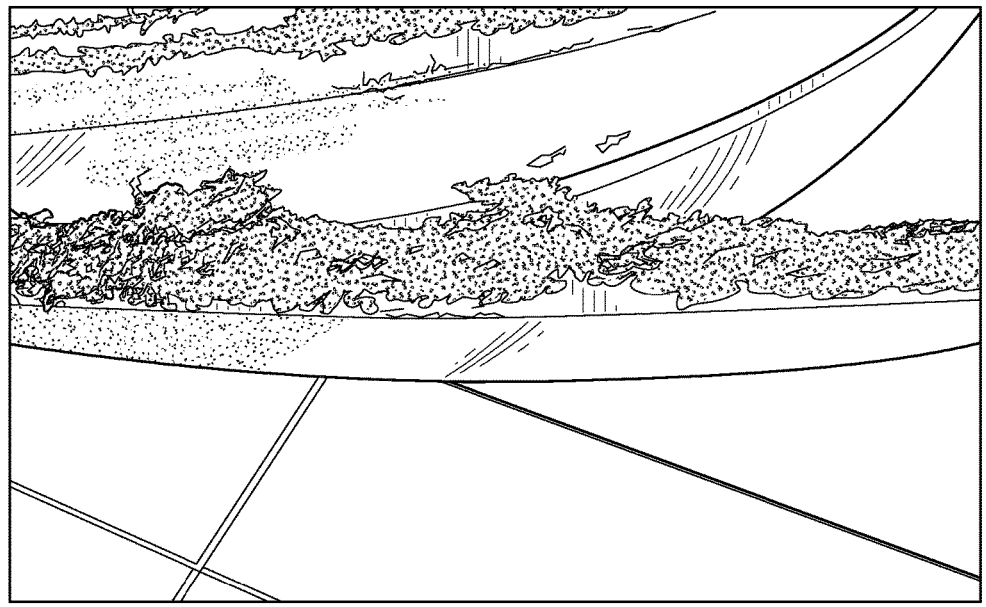
FIG. 4 shows an illustrative diagrammatic view of a portion of a doctor blade of the prior art fraying.

The drawings are shown for illustrative purposes only.

DETAILED DESCRIPTION

In accordance with various embodiments, the invention provides a doctor blade or top plate made from a single 3-dimensional reinforcement fabric of engineered fibre orientation designed to impart key performance properties, with the fibres interlocked together by (1) stitching so that the fabric is free of crimp or (2) by 3 dimensional weaving wherein the fibres are woven together in a 3 dimensional fabric network. These single 3D fabric reinforcement constructions are specifically designed to (1) impart directional properties and (2) eliminate delamination as a doctor blade or top plate failure mode.

The yarns and fibres of the fabric may, for example, be glass, carbon, ceramic, aramid or any single or combination of these as well as glass and/or carbon with high performance thermoplastic combination/comingled yarns and fibres. Other reinforcement fibers may also be used, although softer fibers that do not provide abrasion, such as, polyamide and co-polyester fibres, are not suitable. Polyamide fibres, polyester fibres and polyurethane coatings do not provide the cleaning performance, wear resistance, machine direction stiffness and cross machine flexibility or indeed bevel edge integrity properties required of the papermaking doctor blade or top plate applications as provided by embodiments of the present invention Various embodiments of the invention provide the use of thermoset or high performance thermoplastic resin within the blade construction. Additional embodiments provide the use of nanoparticles in the resin for both thermoplastic and thermoset resins, particularly spherical silica nano-particles and multi-walled carbon nanotubes.

The engineered single 3-dimensional reinforcement fabric may be constructed with specific fibre orientation designed to impart the particular key properties required by a high performance doctor blade or top plate. Where the single 3-dimensional engineered fabric is of greater weight and thickness than those traditionally used in doctor blade constructions and the key properties include sufficient machine direction stiffness, cross machine flexibility, optimum cutting, cleaning, wear life and bevel edge integrity. The single 3-dimensional fabric is reinforced in multiple directions, including through the (z) or thickness dimension, herein referred to as the through-thickness dimension. By using a single 3-D fabric to make a doctor blade there are no individual layers of fabric to delaminate. Thus a doctor blade or top plate made with a single 3-D fabric reinforcement cannot suffer failure by delamination of layers. In a traditional layered 2-D reinforcement product, cracks can form in the resin matrix and then spread quickly along the resin rich areas between the layers of reinforcement. These cracks can arise due to a variety of reasons ranging from differential strains imposed on the layers in the doctor blade or top plate to impacts from foreign bodies, and result in failure due to the product opening up and splitting apart. Incorporating through thickness fibres by using 3-dimensional reinforcement both impedes and significantly reduces any crack propagation and provides better impact damage resistance, whilst at the same time providing improved post impact mechanical properties compared to conventional doctor blades and top plates. Current 2-D laminates lack any Z-direction binders since they have no fibres aligned in the Z-direction.

An important function of the through thickness fibres in a 3-D reinforcement is to provide a mechanical bind for the in-plane fabrics and fibres. The integral nature of the 3-D structure and associated through thickness binders will produce doctor blades and top plates with significantly improved resistance to failure by opening up and splitting apart or by delamination. Additionally, the use of a single 3-D fabric allows specific properties to be built into the doctor blade or top plate by combining different orientations of fibre in different combinations. For example, fibres with 90° orientation can be included to give stiffness in the machine direction whilst maintaining flexibility in the cross machine direction to enable the doctor blade to conform to the contours of the roll and yet still have sufficient rigidity in the machine direction to clean the roll.

Additionally multi-axial oriented fibres, for example, +45°/−45° or +60°/−60 can be included to increase the cutting and cleaning efficiency of the doctor blade. As a further embodiment of the invention, carbon fibres can be included to prolong the life, increase the resistance to abrasive wear and to reduce the frictional drag of the doctor blade against the paper making cylinder or roll. These can be included as individual fibres or yarns as combination glass-carbon fibres, including, but not exclusive to comingled glass-carbon fibres and yarns or twisted glass-carbon fibres and yarns.

In an embodiment of the invention, the combination of different fibres in different orientations can then be stitched together so that they become mechanically bound into a single 3-Dimensional reinforcement fabric of engineered and tailor made fibre orientation. The stitching process consists of inserting a needle carrying a stitch thread through a stack of reinforcement fabric layers or fibres to form a 3-Dimensional structure. In this type of construction, the fibres are interlocked, but are free of crimp. The absence of crimp leads to better wear properties and a cleaner wear edge with the possibility of any castellation eliminated. The single 3-Dimensional reinforcement fabric can then be resin impregnated as a single fabric and consequently resin cured as a single fabric before being processed in to a doctor blade that cannot be peeled apart or delaminated, since it does not consist of individual reinforcement layers.

Figure 5:
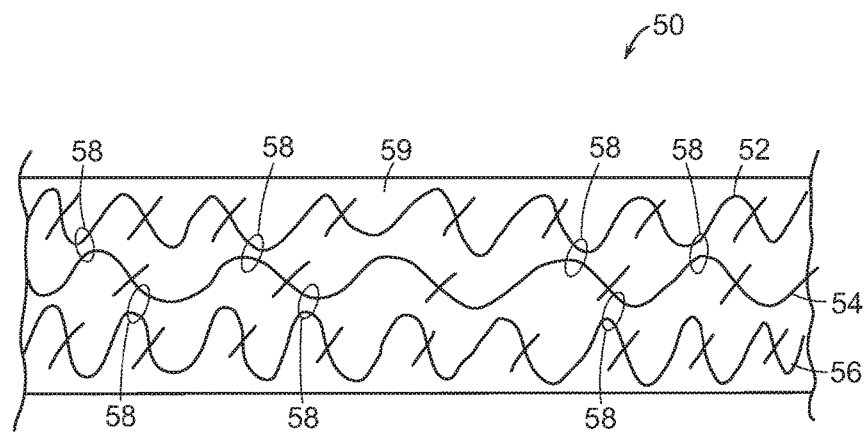
FIG. 5 shows an illustrative diagrammatic view of a planar element in accordance with an embodiment of the invention that includes multiple fabrics that are stitched together.

FIG. 5, for example, shows a planar element 50 in accordance with an embodiment of the present invention for use as a doctor blade or top plate. The planar element 50 includes fabric layers 52, 54 and 56 that are each different, and chosen for core and outer layers desired properties as discussed herein. The fabric layers 52, 54, 56 are stitched together as shown at 58 to provide a composite fabric material that is then impregnated within a resin 59 that includes nanoparticles, and is cured to form the planar element.

In another embodiment of the invention the fibres can be woven together as a single 3 dimensional continuous fabric with 3 dimensional network-like fibre integration, interlacing and interlocking. To produce this type of 3D woven structure, 3 orthogonal sets of yarns (for example a multi-layer warp and two sets of weft) are interlaced in the fabric longitudinal and width directions (x & y) together with the fabric thickness direction (z). Once again the resulting single 3D reinforcement fabric can be resin impregnated as a single fabric and then resin cured as a single fabric before being processed into a doctor blade that cannot delaminate.

Figure 6:
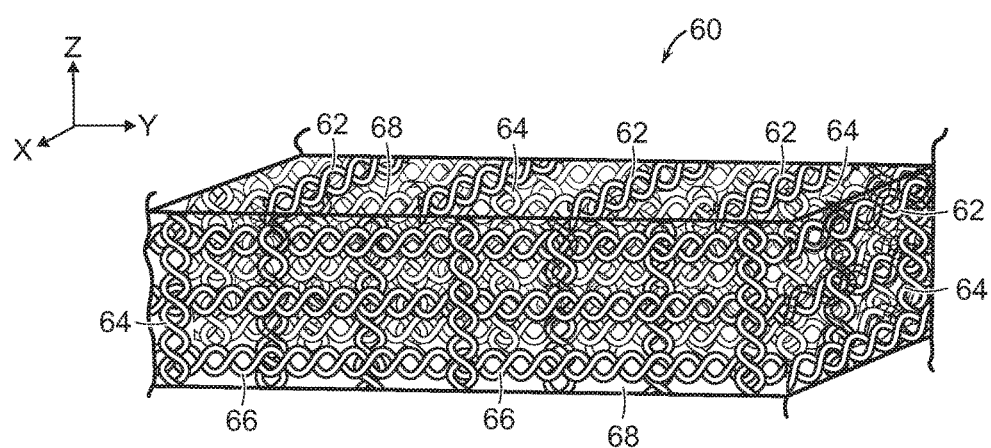
FIG. 6 shows an illustrative diagrammatic view of a planar element in accordance with another embodiment of the invention that includes a single three-dimensional fabric.

FIG. 6 shows a planar element 60 that includes a multi-layer woven fabric structure that includes two sets of weft 64, 66 that are interlaced in the fabric longitudinal (x) and width (y) directions, and a fabric 62 in the thickness (z) direction. The multilayer woven fabric structure is then impregnated within a resin 69 that includes nanoparticles, and is cured to form the planar element.

Both embodiments eliminate delamination as a failure mode. Whilst the resulting doctor blade properties will be dependent on a particular fabric construction and fibre orientation, 3D reinforcement fabrics will have improved strength, stiffness and crack propagation inhibition when compared to the traditional 2D fabrics currently used in doctor blade constructions.

In order to achieve the necessary doctor blade property requirements, the single 3-Dimensional reinforcement fabric is typically much heavier and thicker than a traditional 200 gsm fabric reinforcement used in a typical standard doctor blade. For example it may be in the region of 1700 gsm in weight and 1.5 mm in thickness compared to 200 gsm and 0.2 mm for a current typical doctor blade reinforcement fabric.

Typical, but not exclusive, examples of a 3-Dimensional reinforcement fabric referred to in this invention are:

1. 50 gsm glass veil/200 gsm 90° glass fibres/200 gsm 200 glass fibres/200 gsm +45° glass fibres/400 gsm −45° glass fibres/200 gsm +45° glass fibres/200 gsm 0° glass fibres/200 gsm 90° glass fibres/50 gsm glass fibre veil. Total weight=1700 gsm.
2. 50 gsm glass veil/300 gsm 90° carbon fibres/200 gsm 0° glass fibres/200 gsm +45° glass fibres/400 gsm −45° glass fibres/200 gsm +45° glass fibres/200 gsm 0° glass fibres/300 gsm 90° carbon fibres/50 gsm glass fibre veil. Total weight=1800 gsm.
3. Single 3D woven glass fabric. Total weight=1800 gsm
4. Single 3D woven glass-carbon fabric made with combination glass-carbon fibres (ratio 60:40). Total weight=1600 gsm It is known that micron sized additives may be added to a resin to further enhance both the resin and ultimately the final fabric reinforced composite doctor blade properties. With a single 3-D reinforcement fabric however, the surface fibres will act as a filter and not allow micron sized additives to penetrate into the body of the fabric. They will remain on the surface and will not become homogeneously distributed throughout the final composite doctor blade construction. This will result in a doctor blade with non-uniform distribution of additives and changing characteristics throughout its cross-section. The solution is to use nano particles. The nano-sized additives are small enough to penetrate past the surface fibres. They can, therefore, become homogeneously distributed throughout the doctor blade construction and ensure steady state performance throughout the doctor blade cross-section.

A doctor blade manufactured from a single 3-Dimensional fabric of the above construction, as described in example 1, was discovered to have high machine direction stiffness, whilst at the same time exhibiting cross machine flexibility, but with sufficient cross machine rigidity to aid doctor blade installation into the doctor blade holder. These are optimum properties for a high performance doctor blade. It also displayed optimum cutting and cleaning characteristics due to the inclusion of the multi-axial glass fibres and the fact that it consists of a single fabric means that individual fabric layers cannot be delaminated in contrast to a standard traditional doctor blade construction.

In accordance with various embodiments, therefore, the invention provides a doctor blade or top plate made from an engineered single 3-dimensional reinforcement fabric constructed with specific fibre orientation designed to impart the particular key properties required by a high performance papermaking doctor blade or top plate, where the single 3-dimensional engineered fabric is of greater weight and thickness than those traditionally used in doctor blade constructions and the key properties include sufficient machine direction stiffness, cross machine flexibility, optimum cutting, cleaning, wear life and bevel edge integrity. The fabric may include glass fibres, carbon fibres, ceramic fibres, aramid fibres, inorganic fibres, organic fibres, synthetic fibres and/or modified synthetic fibres. The fabric may include combinations of glass fibres and/or carbon fibres and/or aramid fibres in all possible combinations. The fabric may include combination glass/carbon yarns or fibres, including comingled glass-carbon yarns or fibres and including twisted glass-carbon yarns or fibres. The fabric may include combination glass/high performance thermoplastic (HPT) yarns or fibres, and/or carbon/high performance thermoplastic yarns or fibres and/or glass/carbon/HPT yarns or fibres in all possible combinations, including, but not exclusively, comingled yarns and fibres and/or twisted yarns and fibres, such as, for example, comingled glass and high performance thermoplastic, comingled carbon and high performance thermoplastic, or comingled glass, carbon and high performance thermoplastic.

The doctor blade may contains fibres oriented in the 0° direction, 90° direction, or fiber oriented in multi-axial directions, for example +45°/−45° and/or +60°/−60°, etc. as well as combinations thereof. The doctor blade may includes a thermoset resin, e.g. an epoxy resin. and may be made with a High Performance thermoplastic (HPT) resin, e.g., but not exclusively Polyether ether ketone (PEEK), Polyphenylene sulfide (PPS), Polyether imide (PEI), Polyphthalamide (PPA) or Polyether ketone ketone (PEKK) etc.

The resin may contain nanoparticles, selected from the group consisting of powders, grains, tubes, fibres and platelets. The nanoparticles may be metallic and selected from the group consisting of metal oxides, carbides or nitrides, metallic complexes, ionic structures and covalent bonds. The nanoparticles may be non-metallic and/or covalent and selected from the group consisting of clay particles, silicates, ceramic materials, glass particles, carbon black, fumed silica, calcium carbonate, spherical silica nanoparticles, boron nitride, boron nitride nanotubes, carbon nanotubes, including both multi-walled carbon nanotubes and single walled carbon nanotubes, and nano-spheres of ceramic powders. The nanoparticles may comprise between 0.5% to 75% by weight of the polymeric resin, depending on the type of nanoparticles. The nanoparticles may comprise about 3% by weight of the said polymeric resin matrix, and wherein the nanoparticles consist essentially of carbon nanotubes. The nanoparticles may comprise between 1% to 5% by weight of the polymeric resin matrix, and wherein the nanoparticles consist essentially of carbon nanotubes. The nanoparticles may comprise between 30% to 50% by weight of the polymeric resin matrix, and the nanoparticles may consist essentially of silica nanoparticles.

Those skilled in the art will appreciate that numerous modifications and variations may be made to the above disclosed embodiments without departing from the spirit and scope of the present invention.

What is claimed is:

1. A planar element for use in a papermaking system, said planar element being suitable for use as a doctor blade or a top plate, said planar element comprising:
    a three-dimensional composite structure including elongated elements extending in at least three orthogonal directions; and
    a resin in which the three-dimensional composite structure is embedded.

2. The planar element as claimed in claim 1, wherein the elongated elements extending in at least three orthogonal directions include a plurality of fabrics.

3. The planar element as claimed in claim 2, wherein the plurality of fabrics include a plurality of fibres.

4. The planar element as claimed in claim 3, wherein the plurality of fibres include any of glass fibres, carbon fibres, ceramic fibres, aramid fibres, or inorganic fibres, organic fibres, synthetic fibres, and/or modified synthetic fibres.

5. The planar element as claimed in claim 3, wherein the plurality of fibres include any of glass/high performance thermoplastic (HPT) yarns or fibres, carbon/high performance thermoplastic yarns or fibres, glass/carbon/HPT yarns or fibres in all possible combinations, including, but not exclusively, comingled yarns and fibres, or twisted yarns and fibres.

6. The planar element as claimed in claim 1, wherein the resin is any of an epoxy resin, a high performance (HPT) resin including polyether ether ketone (PEEK), polyphenylene sulfide (PPS), polyether imide (PEI), polyphthalamide (PPA), or polyether ketone ketone (PEKK).

7. The planar element as claimed in claim 1, wherein the resin includes nanoparticles of any of powders, grains, tubes, fibres and platelets.

8. The planar element as claimed in claim 1, wherein the resin includes nanoparticles of any of metal oxides, carbides, nitrides, metallic complexes, ionic structures and covalent bonds.

9. The planar element as claimed in claim 1, wherein the resin includes nanoparticles of any of clay particles, silicates, ceramic materials, glass particles, carbon black, fumed silica, calcium carbonate, spherical silica nanoparticles, boron nitride, boron nitride nanotubes, carbon nanotubes, including both multi-walled carbon nanotubes and single walled carbon nanotubes, and nanospheres of ceramic powders.

10. The planar element as claimed in claim 1, wherein the resin includes nanoparticles that comprise between 0.5% to 75% by weight of the resin.

11. The planar element as claimed in claim 1, wherein the resin includes nanoparticles that comprise about 3% by weight of the resin, and wherein the nanoparticles consist essentially of carbon nanotubes.

12. The planar element as claimed in claim 1, wherein the resin includes nanoparticles that comprise between 1%-5% by weight of the resin, and wherein the nanoparticles consist essentially of carbon nanotubes.

13. The planar element as claimed in claim 1, wherein the resin includes nanoparticles that comprise between 30%-50% by weight of the resin, and wherein the nanoparticles consist essentially of silica nanoparticles.

14. The planar element as claimed in claim 1, wherein the three dimensional composite structure further includes a plurality of elongated element intersections that extend in each of the three orthogonal directions.

15. The planar element as claimed in claim 14, wherein the plurality of elongated element intersections include weave intersections.

16. The planar element as claimed in claim 14, wherein the plurality of elongated element intersections further include stitch intersections.

17. The planar element as claimed in claim 14, wherein the planar element is non-laminated.

18. A doctor blade for use in a papermaking system, said doctor blade comprising:
    a three-dimensional fabric composite structure including elongated elements extending in at least three orthogonal directions, at least some of the elongated elements being woven together; and
    a resin in which the three-dimensional composite structure is embedded.

19. The doctor blade as claimed in claim 18, wherein the three-dimensional fabric includes a plurality of fibres.

20. The doctor blade as claimed in claim 19 wherein the plurality of fibres include any of glass fibres, carbon fibres, ceramic fibres, aramid fibres, or inorganic fibres, organic fibres, synthetic fibres, and/or modified synthetic fibres.

21. The doctor blade as claimed in claim 19, wherein the plurality of fibres include any of glass/high performance thermoplastic (HPT) yarns or fibres, carbon/high performance thermoplastic yarns or fibres, glass/carbon/HPT yarns or fibres in all possible combinations, including, but not exclusively, comingled yarns and fibres, or twisted yarns and fibres.

22. The doctor blade as claimed in claim 18, wherein the resin is any of an epoxy resin, a high performance (HPT) resin including polyether ether ketone (PEEK), polyphenylene sulfide (PPS), polyether imide (PEI), polyphthalamide (PPA), or polyether ketone ketone (PEKK).

23. The doctor blade as claimed in claim 18, wherein the resin includes nanoparticles of any of powders, grains, tubes, fibres and platelets.

24. The doctor blade as claimed in claim 18, wherein the three dimensional fabric composite further includes a plurality of elongated element intersections that extend in each of the three orthogonal directions.

25. The doctor blade as claimed in claim 24, wherein the plurality of elongated element intersections include weave intersections.

26. The doctor blade as claimed in claim 24, wherein the plurality of elongated element intersections further include stitch intersections.

27. The doctor blade as claimed in claim 24, wherein the planar element is non-laminated.

28. A method of forming a doctor blade, said method comprising the steps of:
    forming a three dimensional fabric structure that includes elongated elements that extend at least in part, in each of three mutually orthogonal elongated directions; and embedding the three-dimensional fabric structure with a resin.

29. The method as claimed in claim 28, wherein the step of forming the three dimensional fabric structure includes providing a plurality of elongated element intersections that extend in each of the three mutually orthogonal elongated directions.

30. The method as claimed in claim 29, wherein the plurality of elongated element intersections include weave intersections.

31. The method as claimed in claim 30, wherein the plurality of elongated element intersections are all weave intersections.

32. The method as claimed in claim 29, wherein the plurality of elongated element intersections include at least some stitch intersections.

33. The method as claimed in claim 28, wherein the doctor blade is non-laminated.

\* \* \* \* \*

UNITED STATES PATENT AND TRADEMARK OFFICE
CERTIFICATE OF CORRECTION

PATENT NO. : 10,190,258 B2
APPLICATION NO. : 15/237330
DATED : January 29, 2019
INVENTOR(S) : Draper et al.

It is certified that error appears in the above-identified patent and that said Letters Patent is hereby corrected as shown below:

In Column 5, Line 44, should be corrected to read:
"1. 50 gsm glass veil/200 gms 90° glass fibres/200 gsm 0°"

Signed and Sealed this
Twenty-sixth Day of March, 2019

Andrei Iancu
*Director of the United States Patent and Trademark Office*